(No Model.)

F. MANN.
TEA POT, COFFEE POT, &c.

No. 508,828. Patented Nov. 14, 1893.

WITNESSES:
J. A. Bergstrom
C. Sedgwick

INVENTOR
F. Mann
BY Munn & Co
ATTORNEYS.

United States Patent Office.

FREDERICK MANN, OF LONDON, ENGLAND.

TEA-POT, COFFEE-POT, &c.

SPECIFICATION forming part of Letters Patent No. 508,828, dated November 14, 1893.

Application filed April 24, 1893. Serial No. 471,727. (No model.) Patented in England January 16, 1892, No. 904.

*To all whom it may concern:*

Be it known that I, FREDERICK MANN, of London, England, have invented a new and Improved Tea-Pot, Coffee-Pot, and the Like, (for which I have obtained a patent in England, No. 904, bearing date January 16, 1892,) of which the following is a full, clear, and exact description.

My invention relates to improvements in tea-pots, &c., and especially to strainer attachments for such vessels. The object of my invention is to produce a pot having a central detachable strainer, which is arranged a sufficient distance behind the spout, so as not to interfere with the free pouring of the infusion from the pot, which is thus enabled to have a large straining surface so as to prevent the choking of the spout or of the strainer, which on account of its great surface may be very fine so as to prevent any grounds or leaves from passing through the spout into the cup, and which therefore enables tea-dust to be used in the pot to advantage, as the dust may be retained by the strainer which will still permit the liquid to pass freely.

To this end, my invention consists in certain features of construction and combination of parts, as will be hereinafter described and claimed.

Reference is to be had to the accompanying drawings forming a part of this specification, in which similar figures of reference indicate corresponding parts in all the views.

Figure 1:
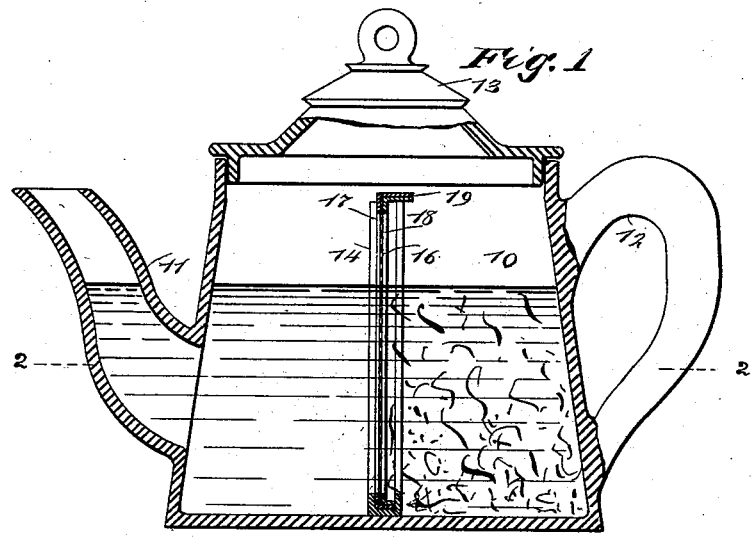
Figure 2:
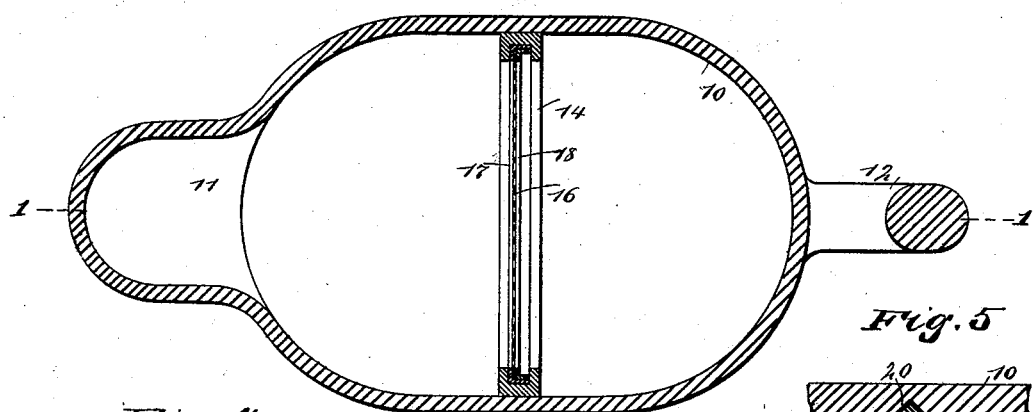
Figure 4:
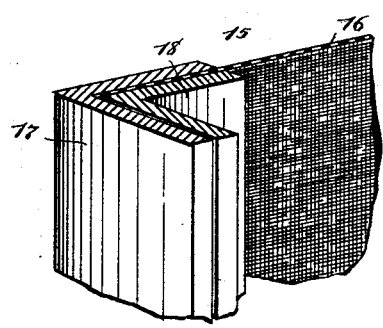
Figure 3:
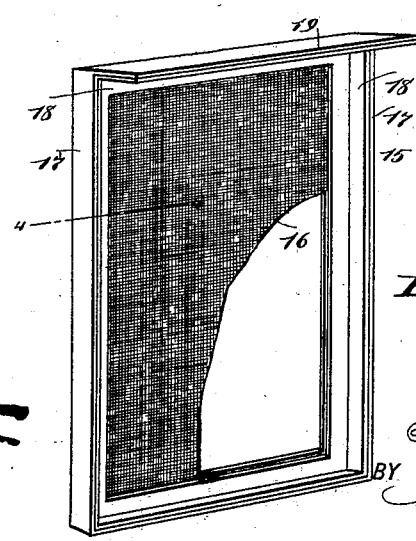

Figure 1 is a central vertical section on the line 1—1 in Fig. 2, of the pot, showing my improvements. Fig. 2 is a sectional plan on the line 2—2 in Fig. 1. Fig. 3 is a broken enlarged detail perspective view of the removable strainer frame and the strainer therein. Fig. 4 is an enlarged detail cross section through the frame and strainer on the line 4—4 in Fig. 3; and Fig. 5 is a detail sectional plan of a modified means for holding the strainer frame in the pot.

The pot 10 may be of any usual kind and of any customary shape, and it has on one side a spout 11 and on the other a handle 12, and is also provided with the usual removable cover 13. Within the pot and preferably at a point near the center, is an essentially U-shaped frame 14, the open end of which is placed uppermost. This frame may be made a part of the pot if desired, or it may be fastened permanently therein in any suitable and convenient way. The frame 14 is provided with a central vertical groove, thus forming a slideway within it, and this groove receives the detachable strainer frame 15 which carries a strainer 16, and when the strainer is in position it will therefore extend vertically and transversely across the pot as shown clearly in Fig. 1, and the tea-leaves, tea-dust or coffee may be placed behind the strainer, as shown in said figure, and the infusion in front of the strainer will be perfectly free from grounds.

The frame 15 is composed of two similar frames 17 and 18, the sides of which are of angular cross section, as shown clearly in Fig. 4, and the edges of the strainer 16 are held firmly between them. When the frame 15 is slipped into the groove of the frame 14, the two parts will be firmly bound together and the strainer will be immovably fixed. The top of the detachable or removable frame 15 is preferably provided with a laterally projecting ledge or flange 19 which serves as a handle which may be grasped when the frame is to be removed or inserted.

Figure 5:
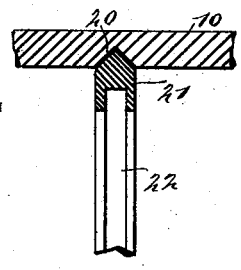

If desired, the pot may be provided on its sides with a vertical groove 20, as shown in Fig. 5, and a frame 21, similar to the frame 14 but shaped to fit the groove 20, may be used, this frame 21 having an inside groove 22 similar to the groove in the frame 14, this groove being adapted to receive the detachable frame 15 which carries the strainer.

It is for the infusion of tea-dust and tea-powder that my invention is especially advantageous, for the ordinary strainer as it is generally constructed does not prevent its passing out into the cup, to the detriment of the tea when poured out and the impoverishment of what is left in the pot, whereas, when my said pot is used and a fairly fine strainer employed, the powder is very perfectly retained and the tea comes away clean and bright, and yet flows quite as freely as when an ordinary pot is used with ordinary unbroken tea. The advantage of being thus able to use tea-dust without the usual attendant disadvantages, is too great to need comment, as it is well known that such dust contains the virtues of the tea in a much greater degree and produces a much stronger infusion than does the unbroken leaf. The strainer proper may be made of perforated metal, wire-gauze, muslin, or of any suitable material.

Instead of providing a groove in the pot for the frame to slide in, as shown in Fig. 5, the arrangement may be reversed, the frame being grooved and a rib produced on the pot to fit the groove of the frame.

Having thus described my invention, I claim as new, and desire to secure by Letters Patent—

1. The combination with a tea pot having grooved sides of a grooved frame sliding in said grooves and a screen frame sliding in said grooved frame, substantially as shown and described.

2. The combination with a tea-pot or the like, of a grooved frame arranged within the pot, a second sliding frame comprising two parts adapted to fit one within the other and to slide in the fixed frame, and a strainer held between the members of the sliding frame and adapted to extend across the pot, substantially as described.

FREDERICK MANN.

Witnesses:
  GEO. E. COPLEY,
  E. S. WRIGHT, Jr.,
*Both of East Paul's Wharf, Upper Thames Street, E. C.*